United States Patent [19]

Remus

[11] Patent Number: 4,466,278
[45] Date of Patent: Aug. 21, 1984

[54] SELF-ADJUSTING BIAS FOR SYNCHRO SYSTEM
[75] Inventor: Casimer F. Remus, Tunkhannock, Pa.
[73] Assignee: The Bendix Corporation, Flight Sys. Div., Teterboro, N.J.
[21] Appl. No.: 443,514
[22] Filed: Nov. 22, 1982
[51] Int. Cl.³ .............................................. G01M 15/00
[52] U.S. Cl. ..................................... 73/115; 73/117.3; 318/692
[58] Field of Search ...................... 73/115, 116, 117.3, 73/4 R, 717, 723; 310/171, 68 B, 162, 165; 318/692; 340/870.11

[56] References Cited
U.S. PATENT DOCUMENTS
2,700,745  1/1955  Depp et al. ...................... 318/692
2,874,541  2/1959  Oberlin ........................... 318/692 X OTHER PUBLICATIONS
Tate, J. D., Using Selsyns for Remote Control and Data Transfer from Instruments and Control Systems, Sep. 1972, pp. 83, 84.

Primary Examiner—Jerry W. Myracle
Attorney, Agent, or Firm—Stanley N. Protigal

[57] ABSTRACT
A system for transmitting an EPR (Engine Pressure Ratio) from a gas turbine is provided with a resolver component (30) which modifies the EPR in accordance with variations in the optimum EPR for a particular turbine under particular conditions. The information from an EPR gauge is transmitted by a synchro transmitter, and is received by a differential transmitter (31) associated with the particular engine being monitored. The differential transmitter (31) is adjusted in accordance with pressure (at 33) and temperature (at 56) conditions in order to provide an EPR reading which is compensated in accordance with actual conditions of pressure and temperature. The differential transmitter (31) is also adjusted (at 45) in order to provide an output which is further varied in accordance with a variation in the optimum EPR under standard conditions for the particular turbine associated with the differential transmitter. The signal from the differential transmitter (31) is used to provide an EPR indication which is artificially changed in order to closely approximate a nominal optimum reading under various conditions of pressure and temperature and despite variations in the performance characteristics of the particular engine associated with the EPR reading. Therefore, the EPR reading being provided by the system is compensated in order to provide an indication of maximum efficiency at a fixed nominal value which is the same for each turbine installed on the aircraft under a wide variety of conditions.

13 Claims, 5 Drawing Figures

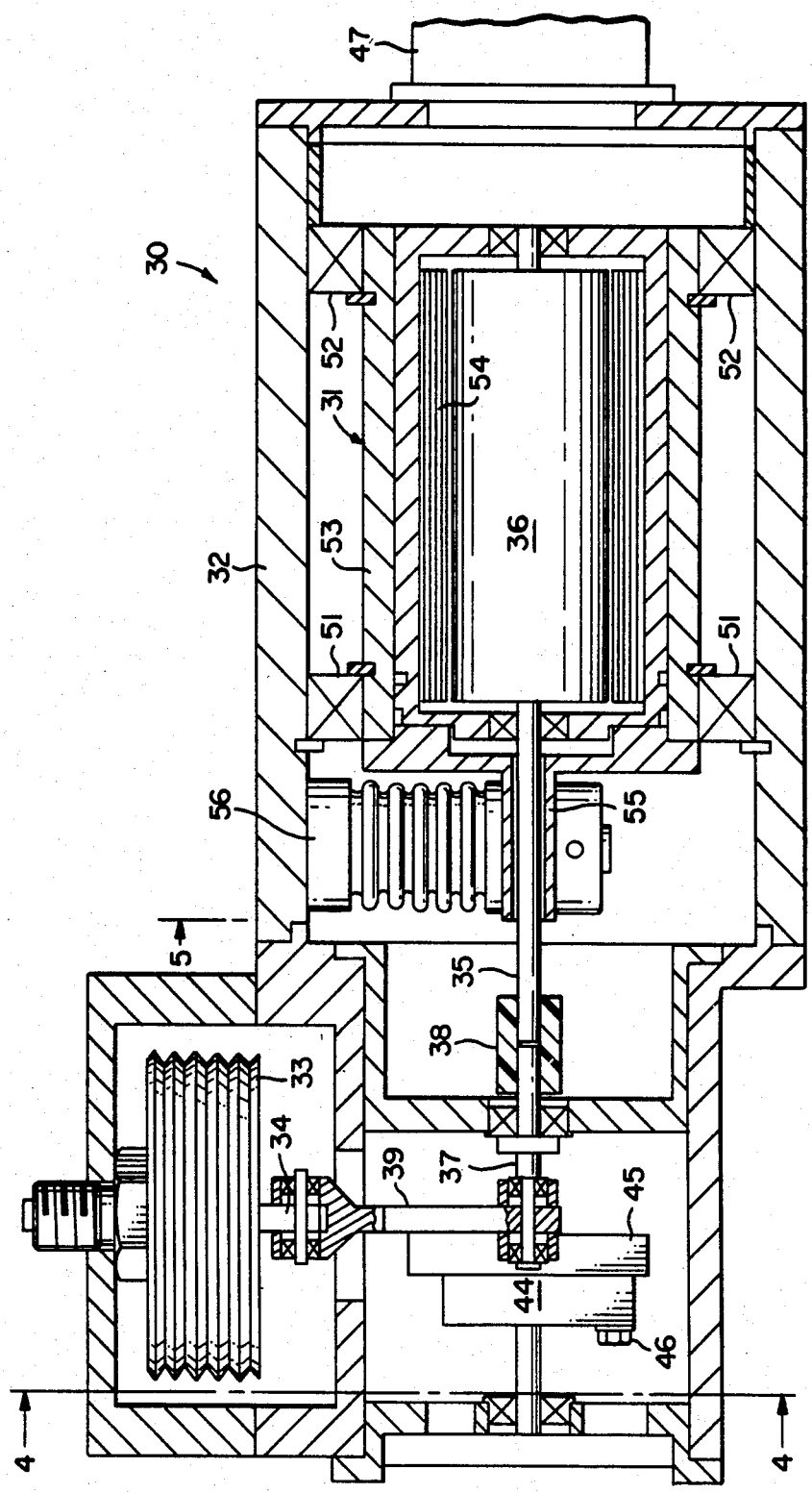

SELF-ADJUSTING BIAS FOR SYNCHRO SYSTEM

BACKGROUND OF THE INVENTION

This invention relates to a compensator which adjusts the output of a synchro system in accordance with sensed conditions. Typically, the invention may be used to provide an optimum indication of EPR (engine pressure ratio) at different ambient pressures and temperatures so that optimum EPR will always be indicated at the same nominal value.

Synchros are electromechanical devices. In physical appearance, they resemble an electric motor. They normally rotate at low enough speed so that they can be treated as transformers. Electrically they are, in effect, transformers whose primary-to-secondary magnetic couplings may be varied by physically changing the relative orientation of the two windings. By their inherent physical properties and their mechanical and electrical design, synchros make possible the accurate transmission and reproduction, at some remote location, of any data or information that can be converted to angular rotation.

When a simple synchro system, consisting of a transmitter and receiver, is supplied with rates voltage and its components are electrically connected together, the receiver shaft will accurately and instantaneously indicate or follow any position or movement assumed by the shaft of the transmitter. Sundry systems can be built using torque, control, and resolver synchro units, making the synchro an indispensable link in the control and operation of complex equipment in military and commercial applications.

Typically, a synchro transmitter consists of a single-phase field magnetically coupled to a three phase Y-connected armature. When an AC voltage is applied to the field, a voltage is induced in each of the armature phases. These induced voltages vary directly with the angle between the actual field position (with respect to the armature) and a zero reference position. When the three armature leads of the transmitter are connected to a Y-connected armature of a second synchro, the voltages produce a resultant magnetic field in the second synchro, having the same angular orientation with respect to its zero reference as the transmitter field. When the second synchro has a single-phase field winding connected to the same power supply that energizes the transmitter field, it is called a synchro receiver and the field aligns itself to the same angle with respect to its armature as the transmitter field.

A synchro can be constructed as a differential transmitter if the single-phase field is replaced with a three-phase field. The output voltages of the three-phase field can then be applied to a receiver synchro. The angular position of the armature and field of the differential transmitter modifies the angular information supplied by the transmitter and the resulting voltages applied to the receiver may represent the sum or difference of the two angles supplied, depending upon the relative direction of shaft location.

The EPR of a gas turbine engine is the pressure ratio between the final compressor stage of the engine and the first exhaust turbine stage. This ratio provides an indication of the performance of the turbine at any given RPM to the extent that optimum efficiency can be obtained by adjusting the turbine's EPR.

A critical factor in the operating costs of commercial aircraft and in the cruise range of military aircraft is the fuel economy obtained by the aircraft. A savings resulting from an increased fuel efficiency of a fraction of a percent can result in a considerable annual savings in the cost of running a commercial aircraft and can increase the target range and air time of military aircraft, thereby making it important to provide a pilot or other controller with an indication of optimum control settings for the turbine.

The optimum EPR of individual turbines is known to vary as a result of such things as blade dimensions peculiar to the individual turbine, as well as other manufacturing tolerances. The optimum EPR can be determined by using test bench facilities. Therefore, on a four-engine aircraft, each engine may have a different optimum EPR, requiring four different EPR settings. In order to avoid re-calibrating cockpit instruments every time a turbine is removed and replaced on a commercial aircraft, an additional component called a resolver (shown in FIGS. 1-2) is used. The resolver uses a differential transmitter which is electrically connected between a transmitter servo associated with an EPR sensor and a receiving servo associated with a cockpit display of the EPR. The resolver component should not be confused with the use of the term, "resolver" to refer to a synchro with a two-phase signal line, as typically the resolver component described in this application utilizes a three-phase differential transmitter.

The cockpit display typically has an indication thereon concerning an optimum EPR value. Since the turbines are normally tested in a test cell prior to delivery, it is possible to make an emphirical determination, prior to delivery, as to the optimum EPR for the individual turbine. The resolver component is adjusted by rotating one set of Y-connected windings with respect to another set by an amount which will cause a desired phase shift in the resolver component's output from its input. The different electrical phase angle results from the resolver component's coil windings being physically in an out-of-phase relationship with each other. The resolver component is conveniently mounted on the side of the turbine as an accessory, an arrangement which automatically results in the proper EPR gauge being affected.

The optimum EPR for the turbines is known to change in accordance with changes in the ambient temperature and pressure in which the turbine is operating. For commercial aircraft, the optimum EPR is therefore selected from an estimated altitude, such as 9,000 meters. The pilot may also be given charts which indicate optimum EPRs in accordance with different flight levels. Because at altitudes in excess of approximately 10,000 meters, atmospheric temperature ceases to drop, a reading of pressure is insufficient to provide an accurate indication of air density and consequently is insufficient to provide a direct relationship to optimum EPR. For this reason, optimum ratios would vary, not only with ambient pressure, but also with ambient temperature, which does not exhibit a linear relationship with pressure.

The resolver components currently used to compensate for individual differences in optimum EPRs actually add a "fudge factor" to a pilot's EPR reading by providing the pilot with a reading which is altered so that the optimum EPR corresponds to the estimated optimum EPR indicated on the pilot's indicator. For example, the optimum EPR for a given model of turbine may nominally be 12.2. If an individual turbine of that model is predicted during test procedures to have an optimum value of 12.3, the resolver component will be calibrated to provide the pilot with a reading of 12.2 when the measured EPR is actually 12.3. This reading would provide an optimum indication which is calibrated for each turbine but would not provide an optimum indication for all ambient temperature and pressure conditions. While at most flight levels, these optimum EPR's can be predicted in accordance with temperature and pressure, the EPR reading is not altered in the prior art to compensate for these changes.

Accordingly, it is an object of this invention to provide apparatus which adjusts a differential in accordance with sensed conditions in order to provide a modified output of a synchro in accordance with the sensed conditions. More specifically, it is an object of the invention to provide a means to compensate for pressure and temperature conditions and to provide an optimumm EPR reading for an aircraft.

SUMMARY OF THE INVENTION

The present invention contemplates the insertion of a resolver component having a differential transmitter into a synchro system, with the differential transmitter having a means to externally adjust its output phase angle in accordance with the sensed conditions. This is accomplished by mounting the differential transmitter within an external housing so that both the differential transmitter's stator housing and a shaft connected to the differential transmitter's rotor may rotate. The shaft is connected to an aneroid barometer in such a way as to cause the shaft to rotate in accordance with the ambient pressure measured by the aneroid barometer. Temperature sensitivity is gained by using temperature-sensing bellows to rotate the differential transmitter housing in accordance with temperature changes. A zero adjustment is provided on the linkage of the aneroid barometer to the shaft in order to calibrate a correction factor into the resolver in accordance with the optimum pressure ratio characteristics of the individual turbine, as determined during testing of the turbine.

BRIEF DESCRIPTION OF THE DRAWINGS

FIG. 3 is a side view of the differential transmitter of the invention;

DETAILED DESCRIPTION OF THE PREFERRED EMBODIMENT

Figure 1:
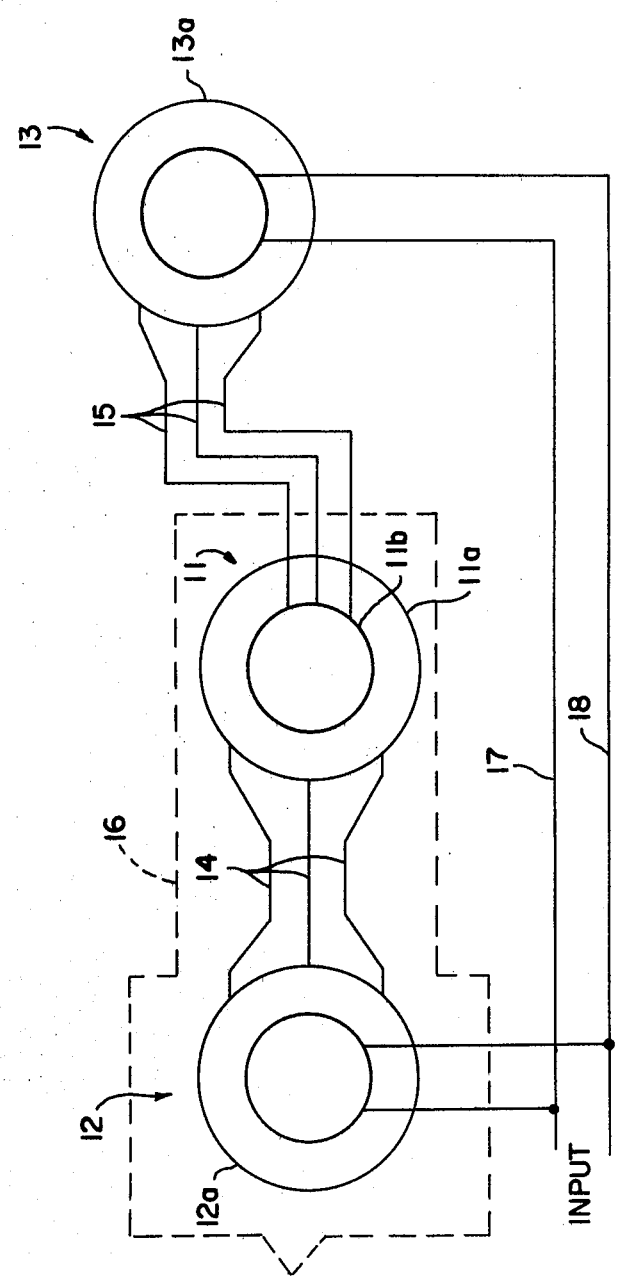
FIG. 1 shows a typical circuit diagram of a synchro system using a differential transmitter for providing a compensating adjustment.

Referring to FIG. 1, a compensating differential transmitter synchro 11 is connected between a transmitting servo 12 and a receiving servo 13 in order that signals between the transmitting and receiving servos 12, 13 may be shifted in phase according to a shaft angle of the differential transmitter 11. The differential transmitter 11 is considered to be a type of servo which is connected in series with the three-phase lines of transmitting and receiving servos. As shown in FIG. 1, three-phase connections 14, 15 are connected to the stators 12a, 13a of transmitting and receiving synchros 12, 13 respectively and connected to the stator 11a and rotor 11b of differential transmitter synchro 11 in a particular manner. It is, however, possible to provide the three-phase portions of servos 12, 13 on the rotor, as well as to interchange the rotor and stator connections of the differential transmitter servo 11. The transmitting servo 12 and the compensating differential transmitter servo 11 are mounted on the aircraft's turbine, schematically represented by dashed line 16, in order that the transmitting servo 12 be responsive to the turbine's EPR and the compensating differential transmitter servo 11 be associated with that turbine. The adjustment consists of shifting the differential transmitter's rotor (connected with connections 15) with respect to its stator (connected with connections 14). As well known in the art of connecting servos, the transmitting and receiving servos 12, 13 are connected to field (input) connections 17, 18.

While three-phase synchros 11, 12 and 13 are shown in FIG. 1, other systems can be used, such as resolver synchros, optical resolvers and other devices used in systems in which an encoder produces a phase-variable signal in which the phase of the signal is variable as a function of shaft angle or position. Furthermore, it is possible to utilize this system where the encoder is supplied with a carrier signal which is converted into the phase-variable signal by the encoder, with the encoder effectively modulating the phase of the carrier signal as a function of the shaft angle or position.

Figure 2:
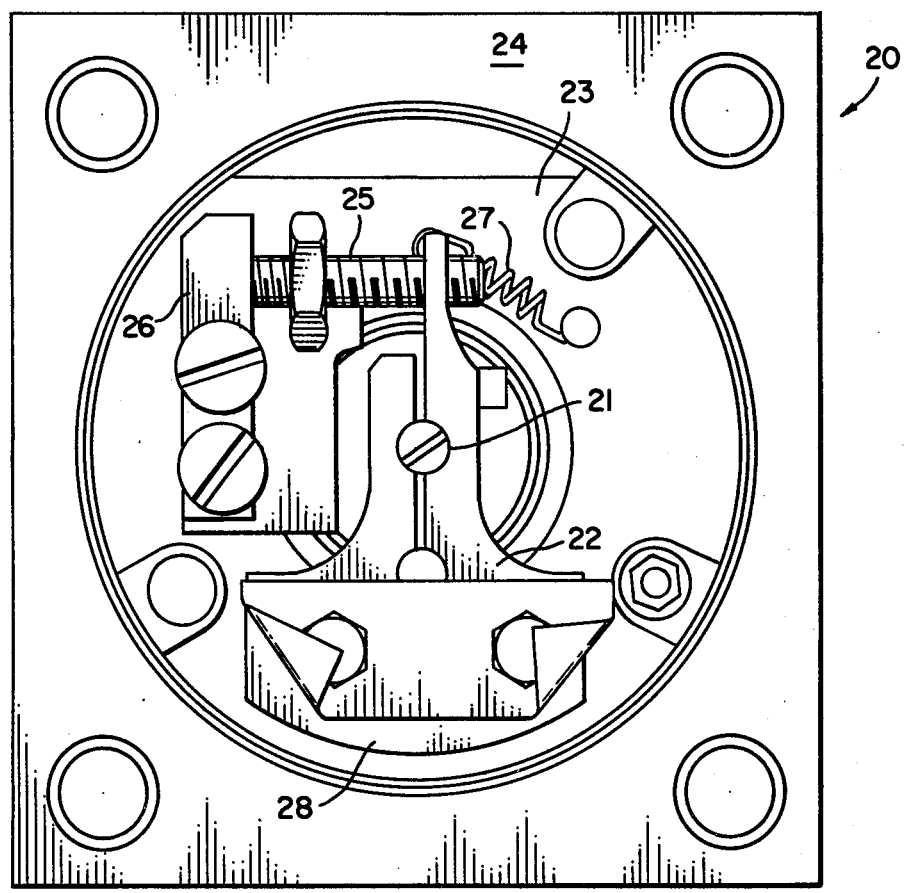
FIG. 2 is a representation of a prior art differential transmitter having compensation adjustment means.

Referring to FIG. 2, a differential transmitter 20 used in a typical prior art compensating system is shown. The differential transmitter 20 has a shaft 21 which is locked onto a clamp 22. A stator housing 23 is fixedly mounted to an external housing 24 and the clamp 22 pivots about an axis defined by the shaft 21. The clamp 22 rotationally aligns the shaft 21 by means of a differentially threaded adjusting screw 25 which adjusts the distance (at the screw 25) between the clamp 22 and a block 26. Both the clamp 22 and the block 26 have female threads (not shown) to receive the screw 25. Slack at the threads is taken up by an anti-backlash spring 27. A mounting flange 28 also supports the clamp 22 and the clamp 22 is held in the rotationally aligned position with a clamp nut (not shown).

In order to provide a compensating adjustment, a desired change in the optimum EPR reading is first determined for the individual turbine (not shown), usually within a test cell (not shown). When this value is obtained, the resolver 20 is connected between a transmitting and receiving resolver in the manner shown in FIG. 1 and is adjusted in order to provide a desired change in the EPR reading, the adjustment being fixed with the clamp nut.

Figure 4:
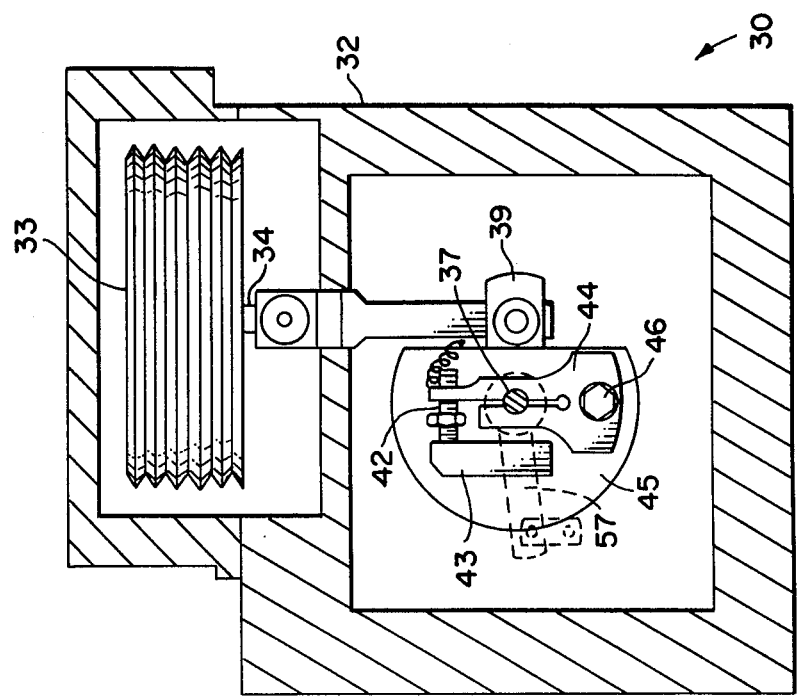
FIG. 4 is a sectional view taken along line 4—4 of FIG. 3.

Referring to FIGS. 3 and 4, a self-adjusting compensator 30 according to the invention is provided, in which a differential transmitter synchro 31 is mounted within a specialized housing 32. An aneroid bellows 33 is mounted to the specialized housing 32 and is responsive to ambient air pressure so as to cause a free end 34 of the bellows 33 to respond to ambient atmospheric pressure. The differential transmitter synchro 31 has a shaft 35 connected to its rotor portion 36 as is conventional in the art of synchro manufacturing. A shaft extension 37 is connected to the shaft 35 by a flex coupling 38 and is journaled into the specialized housing 32. A crank-and-arm linkage 39 connects the free end 34 of the aneroid bellows 33 to the shaft extension 37 and translates the linear movement of the free end 34 to rotary movement so as to rotate the shaft extension 37, thereby rotating the synchro's rotor.

As particularly shown in FIG. 4, a zero adjustment arrangement is provided by a differentially threaded screw 42 operating against a block 43 and clamp 44. This adjustment works in a manner similar to that of the prior art compensating system shown in FIG. 2, although the block 43 is necessarily fixed to a plate 45 which travels with the linkage 39 (FIG. 3). A clamp nut 46 permits zero adjustment setting to be secured. As can be seen, the differential transmitter shaft 35 (FIG. 3) is rotated in accordance with the barometric pressure, as indicated by bellows 33 from an initial angle which is determined by an initial zero adjustment. The self adjusting compensator 30, more specifically the differential transmitter 31, is electrically connected to the rest of the system's transmitting and receiving synchros by means of an electrical connector 47.

Figure 5:
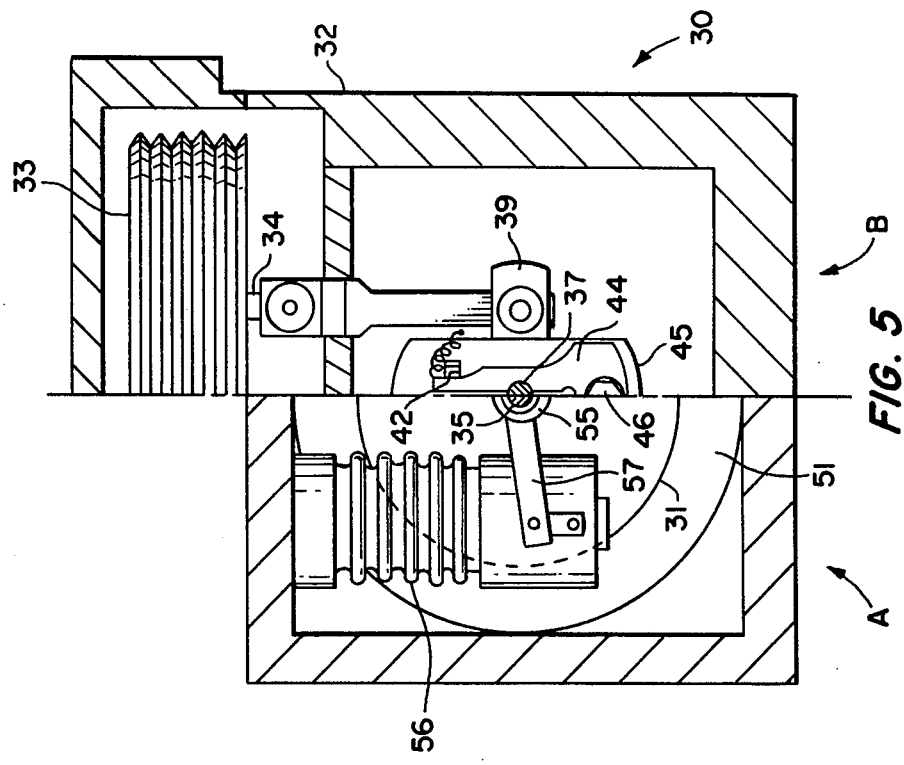
FIG. 5 is a split sectional view taken along lines 5—5 (Section A) and 4—4 (Section B) of FIG. 3, and particularly showing the relative positions of bellows mechanisms used in the invention.

Referring to FIGS. 3 and 5, the differential transmitter 31 is mounted within the specialized housing 32 by a set of bearings 51, 52 so that the differential transmitter's outer shell 53 may rotate within the specialized housing 32. The rotation of the outer shell 53, of course, causes the differential transformer's stator 54 to rotate accordingly. A nose extension 55 is fixed to the synchro's outer shell 53 and therefore rotates with the outer shell 53. Attached to the nose extension 55 is a temperature sensing bellows 56 which is filled with liquid, which may be a voluable liquid and which expands and contracts with changes in temperature. Such fluid in bellows is well known in the art of aircraft instrumentation, the fluid being commonly referred to as sylphon fluid. The temperature sensing bellows 56 is fixed to the specialized housing 32 and is connected to the outer shell 53 of the differential transmitter synchro 31 by means of a crank and lever arrangement 57.

The temperature sensing bellows 56 expands with an increase in temperature because of the Newtonian expansion of the fluid within the bellows 56 at increased temperature. On the other hand, the aneroid pressure sensing bellows 33 contracts with an increase in pressure because the bellows is usually sealed, containing a fixed mass of gaseous fluid which is compressed at increased barometric pressure in order for the system to reach equalibrium. An increase in temperature, as well as decrease in pressure reduce the density of air and therefore similarly affect the performance of a gas turbine. For this reason, the two sets of bellows 33, 56 are arranged to rotate their respective differential transmitter components in opposite directions. This relationship can be seen in FIG. 5. Thus, if either bellows 33 or 56 expands, the differential transmitter's rotor or stator are rotated in the same direction relative to the other.

The differential transmitter is, in the preferred embodiment, a modification of a Bendix Corporation Size 11 Control Differential Transmitter, similar to the Bendix Corporation model 3563113-0010, although modified in order to accommodate the bearings 51 and to incorporate the nose extension 54.

It is also possible to provide similar devices which modify a phase angle of a transmitted signal. For example, it is possible to use an optically transmitted signal containing phase information or likewise to use phase information provided on a carrier. In either case, the phase information will be varied by an apparatus which, in the case of adjusting indicated EPR, is responsive to changes in temperature and pressure. Other measurements of engine performance, such as engine speed (RPM) can be modified by such conditions as EPR or vice versa, using this invention.

It is also contemplated that vehicles other than aircraft using a primary sensed condition for control will advantageously be able to use additional inputs which affect the results of measuring the first condition with respect to the item being controlled. For example, the primary sensed condition could be an oxygen level in an exhaust stream of an internal combustion engine. This level would be compensated for by providing fuel and air, the effects of which are both affected by the air density caused by changes in temperature and altitude.

While a receiving synchro has been described, some modern aircraft use digital equipment. In these cases, the receiving synchro would be the digital equivalent of a mechanical synchro. It is further contemplated that signals will be in a non-phase-dependent form. These and other variations would be made to the embodiment in accordance with current design practices. This system may also be used to provide indications which can be used by a computerized engine control device to control turbine speed in accordance with optimum EPR readings. For these reasons, the invention should be read as limited only by the claims.

What is claimed:

1. In a system for sensing a condition of a gas turbine on a vehicle by sensing an engine pressure ratio of the turbine, in which the turbine has a first condition measuring means, transmitting means for transmitting a signal containing information from said measuring means and means for receiving corresponding information, apparatus to compensate for ambient conditions characterized by:
   (a) a second condition sensor providing a sensed second condition;
   (b) differential transmitter means connected to the transmitting means, to the receiving means and to the second condition sensor for receiving the information transmitted by the transmitting means and transmitting the corresponding information to the receiving means;
   (c) the differential transmitter means varying the signal from the transmitting means to provide the corresponding information in accordance with the sensed second condition.

2. Apparatus as described in claim 1 further characterized in that the second condition being sensed is ambient pressure.

3. Apparatus as described in claim 1 further characterized in that:
   (a) the information contained in the transmitted signal is provided at a predetermined phase angle;
   (b) the differential transmitter means has at least two relatively moving parts; and
   (c) the second condition sensor causes the differential transmitter means to change the phase angle by causing one of the relatively moving parts to move with respect to the other.

4. Apparatus as described in claim 3 further characterized in that:
   the relatively moving parts are a rotor and a stator.

5. Apparatus as claimed in claim 3 further characterized by:
   (a) a third condition sensor providing a sensed third condition;

(b) the third condition sensor causing the other of the relatively moving parts to move with respect to said one of the relatively moving parts.

6. Apparatus as claimed in claim 1 further characterized in that:
a calibration adjustment means is provided for setting an initial change in the information transmitted by the differential transmitter means so that the receiving means is provided with said corresponding information adjusted in accordance with the individual characteristics of the gas turbine associated with the system.

7. Apparatus for sensing a condition characterized by:
(a) first condition sensing means providing a first signal corresponding to a first predetermined value;
(b) a transmitting synchro for transmitting the first signal at a predetermined phase angle;
(c) a receiving means for receiving a signal corresponding to the first signal;
(d) a housing;
(e) a second condition sensor providing a second signal corresponding to a second sensed condition;
(f) a differential transmitter, connected to the transmitting synchro and the receiving means, for receiving the information transmitted by the transmitting synchro and transmitting the corresponding signal to the receiving means, the differential transmitter having two relatively rotatable parts within the housing, and varying the phase angle to the first signal in accordance with the relative position of the two relatively rotatable parts in order to provide the corresponding signal; and
(g) means to rotate one of the relatively rotatable parts with respect to the other rotatable part in accordance with the sensed additional condition.

8. Apparatus as described in claim 7 further characterized by:
the first condition transmitting means being a synchro.

9. Apparatus as described in claim 7 further characterized in that the second sensed condition is pressure.

10. Apparatus as described in claim 7 further characterized in that the second sensed condition is temperature.

11. Apparatus as described in claim 7 further characterized by:
(a) a third condition sensing means for providing a third signal corresponding to a third predetermined condition;
(b) the differential transmitter being connected to the third condition sensing means, and responsive to the third signal for rotating a second of the two relatively rotating parts.

12. Apparatus as described in claim 7 further characterized by:
(a) the second sensed condition being ambient pressure;
(b) a third condition sensor being provided to sense a temperature condition; and
(c) the differential transmitter further varying said phase angle in response to the sensed temperature condition.

13. Apparatus as described in claim 7 further characterized by:
calibration adjustment means connected to the differential transmitter for providing an initial change in the phase angle in accordance with individual characteristics of equipment associated with the system.

* * * * *